United States Patent
Huang et al.

(10) Patent No.: US 11,843,762 B2
(45) Date of Patent: Dec. 12, 2023

(54) SWITCHABLE FLOATING IMAGE DISPLAY DEVICE

(71) Applicant: Industrial Technology Research Institute, Hsinchu (TW)

(72) Inventors: Yi-Hsiang Huang, Changhua County (TW); Yu-Hsiang Liu, Chiayi (TW); Chia-Ping Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/730,224

(22) Filed: Apr. 27, 2022

(65) Prior Publication Data

US 2022/0345687 A1 Oct. 27, 2022

Related U.S. Application Data

(60) Provisional application No. 63/180,636, filed on Apr. 27, 2021.

(30) Foreign Application Priority Data

Mar. 25, 2022 (TW) .................................. 111111294

(51) Int. Cl.
*H04N 13/32* (2018.01)
*H04N 13/305* (2018.01)

(52) U.S. Cl.
CPC ............ *H04N 13/32* (2018.05); *H04N 13/305* (2018.05)

(58) Field of Classification Search
CPC ....... H04N 13/32; H04N 13/305; G02B 30/56
See application file for complete search history.

(56) References Cited

U.S. PATENT DOCUMENTS

| 8,976,323 B2 | 3/2015 | Smithwick et al. |
| 9,691,345 B2 | 6/2017 | Park et al. |
| (Continued) | | |

FOREIGN PATENT DOCUMENTS

| CN | 102446456 | 3/2015 |
| CN | 106165002 | 8/2020 |
| (Continued) | | |

OTHER PUBLICATIONS

Office Action of Taiwan Counterpart Application, dated Nov. 14, 2022, p. 1-p. 7.

*Primary Examiner* — Michael Lee
(74) *Attorney, Agent, or Firm* — JCIPRNET

(57) ABSTRACT

A switchable floating image display device, including a light-emitting stack layer, a light-emitting pattern stack layer, a transparent barrier layer, an optical imaging module, and a power supply module, is provided. The light-emitting stack layer is configured to generate a first pattern beam. The light-emitting pattern stack layer is configured to generate a second pattern beam. The transparent barrier layer is disposed between the light-emitting stack layer and the light-emitting pattern stack layer. The optical imaging module is configured to enable the first pattern beam to form a first floating image, and enable the second pattern beam to form a second floating image. The power supply module is electrically connected to the light-emitting stack layer and the light-emitting pattern stack layer, and configured determine whether to generate the first or second floating image by switching between the light-emitting stack layer and the light-emitting pattern stack layer to emit light.

16 Claims, 14 Drawing Sheets

(56) References Cited

U.S. PATENT DOCUMENTS

| | | |
|---|---|---|
| 10,810,917 B2 | 10/2020 | Fattal |
| 2007/0285410 A1* | 12/2007 | Shibasaki ................ G09G 3/20 |
| | | 345/204 |
| 2008/0040842 A1* | 2/2008 | Sanabria ................ E03D 9/052 |
| | | 4/213 |
| 2008/0231548 A1 | 9/2008 | Koyama |
| 2013/0277656 A1* | 10/2013 | Seo ...................... H10K 50/121 |
| | | 257/40 |
| 2022/0321867 A1* | 10/2022 | Makinen ................ G02B 30/33 |

FOREIGN PATENT DOCUMENTS

| | | |
|---|---|---|
| JP | 5352494 B2 * | 11/2013 |
| TW | 201222006 | 6/2012 |
| TW | M595231 | 5/2020 |
| WO | 2021096447 | 5/2021 |

\* cited by examiner

SWITCHABLE FLOATING IMAGE DISPLAY DEVICE

CROSS-REFERENCE TO RELATED APPLICATION

This application claims the priority benefit of U.S. Provisional Application No. 63/180,636, filed on Apr. 27, 2021, and Taiwan application serial no. 111111294, filed on Mar. 25, 2022. The above-mentioned patent application is hereby incorporated by reference herein and manufactured a part of this specification.

BACKGROUND

Technical Field

The disclosure relates to a display device, and more particularly to a switchable floating image display device.

Description of Related Art

As the COVID-19 pandemic spreads around the world, non-contact technology has become more important, which can effectively prevent the risk of virus contact transmission in public facilities. By adopting non-contact interface technology, the user does not need to contact the surface of an object, which can prevent residual body fluids to destroy the path for indirect contact infection.

For example, if a floating image button is manufactured to replace the traditional physical button, the public may operate normally in situations such as taking an elevator, opening and closing a door, or ringing a bell, without causing contact infection.

The traditional three-dimensional image switchable design adopts an active-matrix display to display different images to achieve image switching. However, the cost of the active-matrix display is expensive and the design is relatively complicated, which makes it difficult to be integrated into a device with low cost or small volume requirements such as a floating image button.

SUMMARY

An embodiment of the disclosure provides a switchable floating image display device, which includes a light-emitting stack layer, a light-emitting pattern stack layer, a transparent barrier layer, an optical imaging module, and a power supply module. The light-emitting stack layer is configured to generate a first pattern beam. The light-emitting pattern stack layer is configured to generate a second pattern beam. The transparent barrier layer is disposed between the light-emitting stack layer and the light-emitting pattern stack layer to block electrical communication between the light-emitting stack layer and the light-emitting pattern stack layer. The optical imaging module is configured to enable the first pattern beam to form a first floating image, and enable the second pattern beam to form a second floating image. The power supply module is electrically connected to the light-emitting stack layer and the light-emitting pattern stack layer, and is configured to determine whether to generate the first floating image or the second floating image by switching between the light-emitting stack layer and the light-emitting pattern stack layer to emit light.

DETAILED DESCRIPTION OF DISCLOSED EMBODIMENTS

Figure 1:
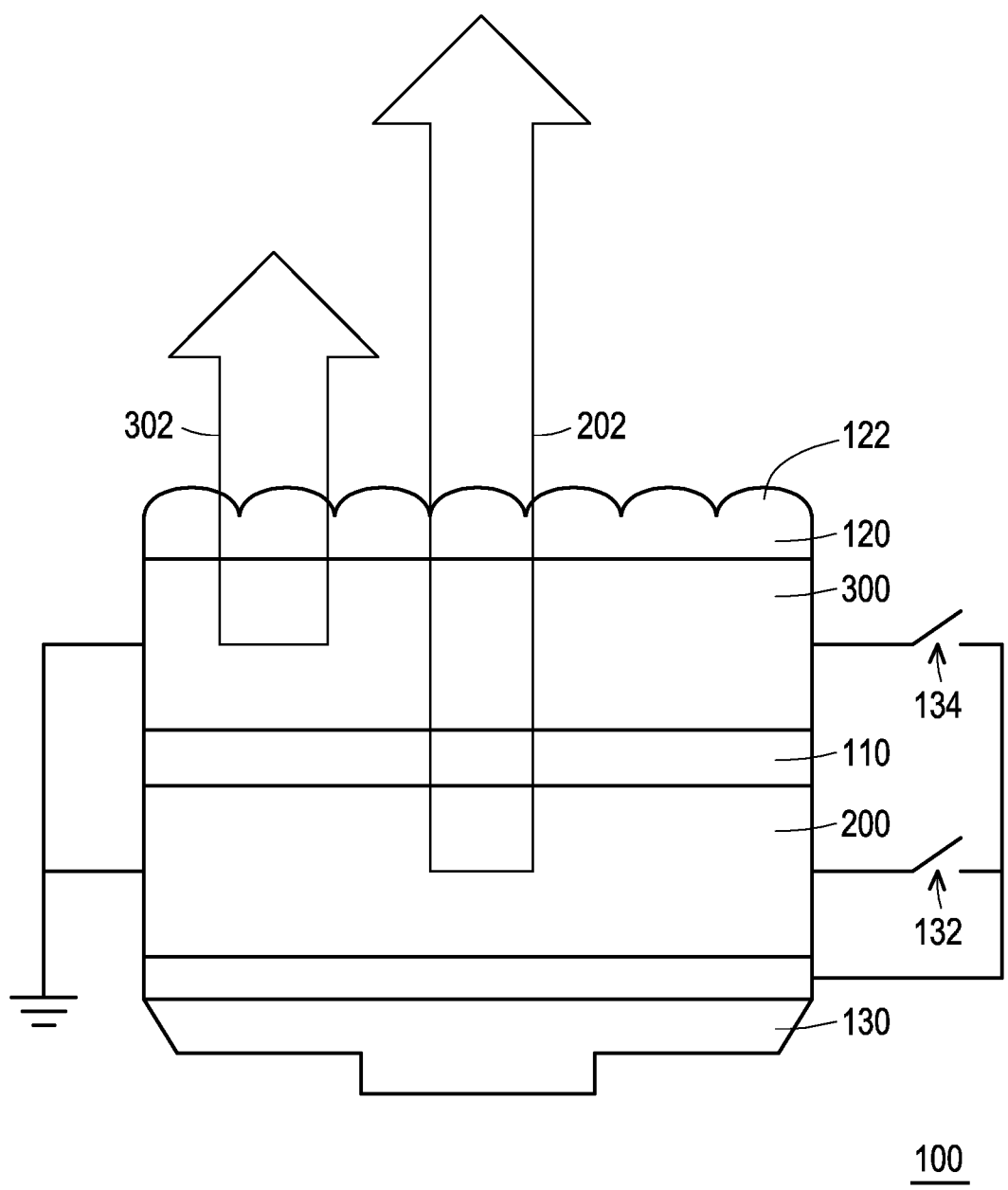
FIG. 1 is a schematic view of a switchable floating image display device according to an embodiment of the disclosure.
Figure 2A:
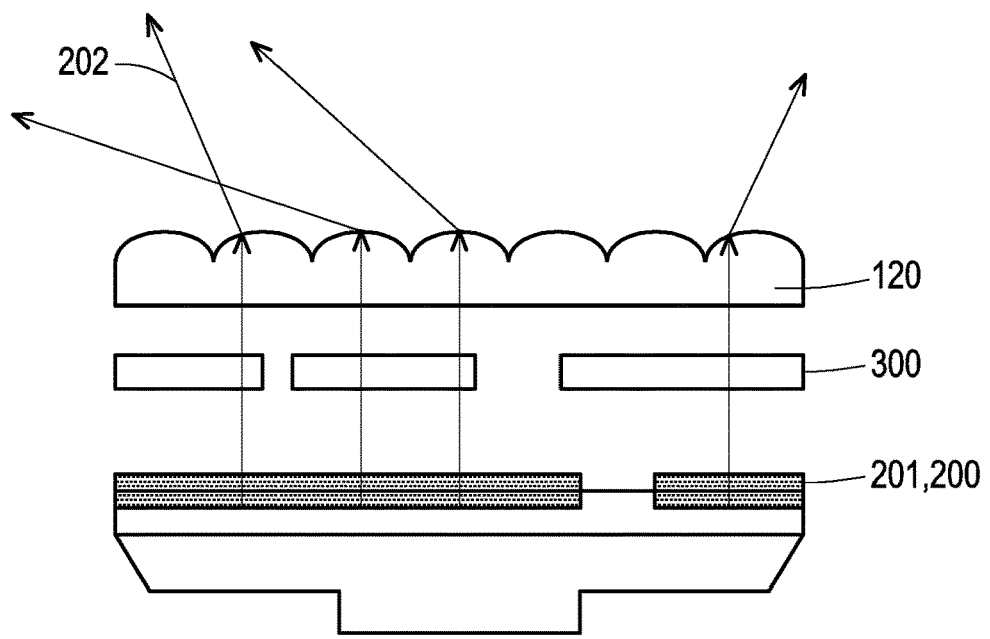
FIG. 2A is a schematic view of a light-emitting stack layer of FIG. 1 when light is emitted.
Figure 2B:
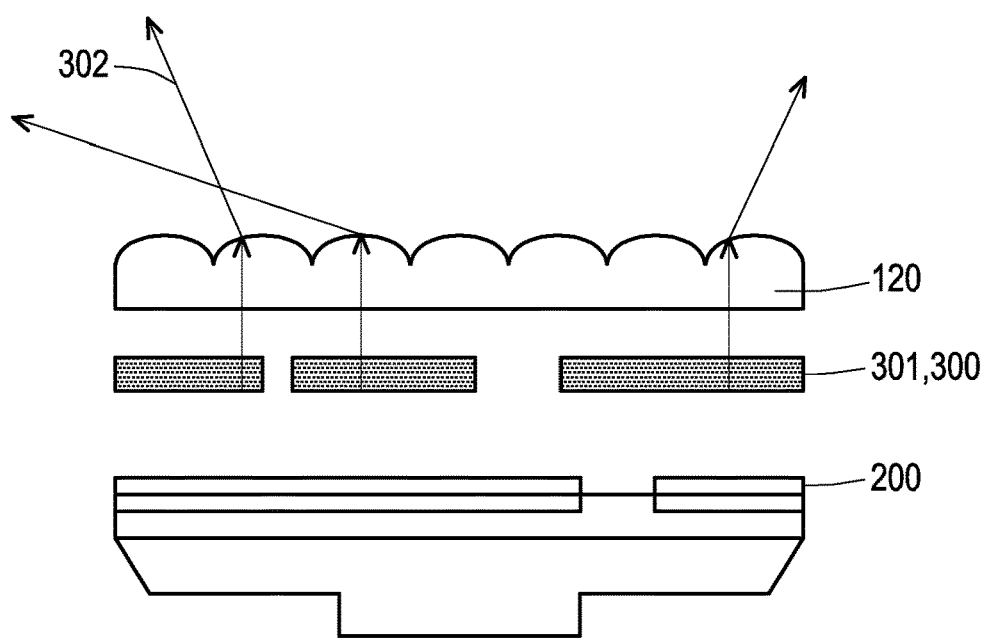
FIG. 2B is a schematic view of a light-emitting pattern stack layer of FIG. 1 when light is emitted.
Figure 3A:
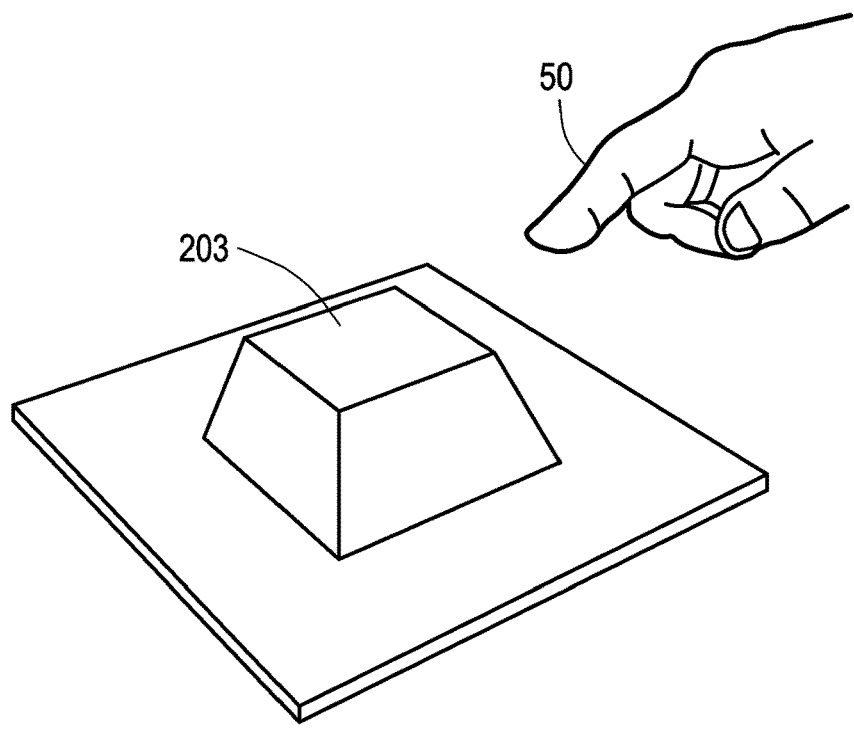
FIG. 3A is a schematic view of a first floating image and a finger of a user provided when the light-emitting stack layer emits light.
Figure 3B:
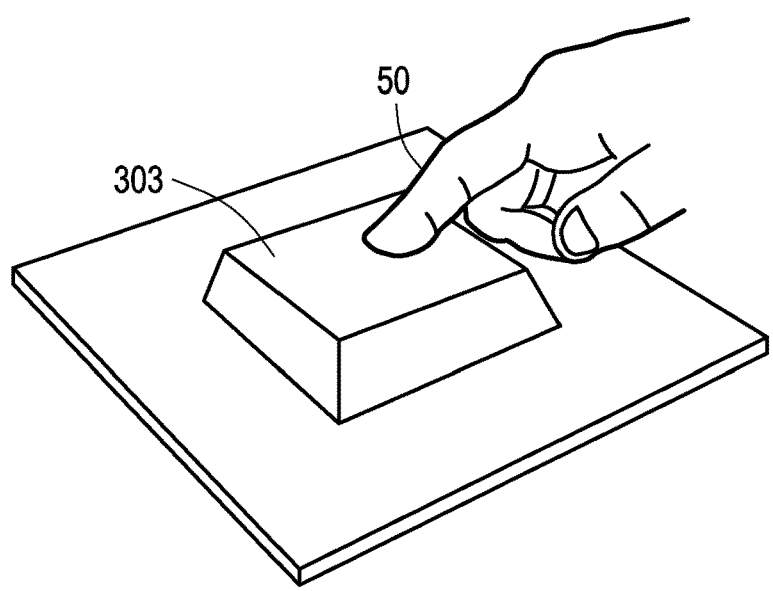
FIG. 3B is a schematic view of a second floating image and the finger of the user provided when the light-emitting pattern stack layer emits light.
Figure 4:
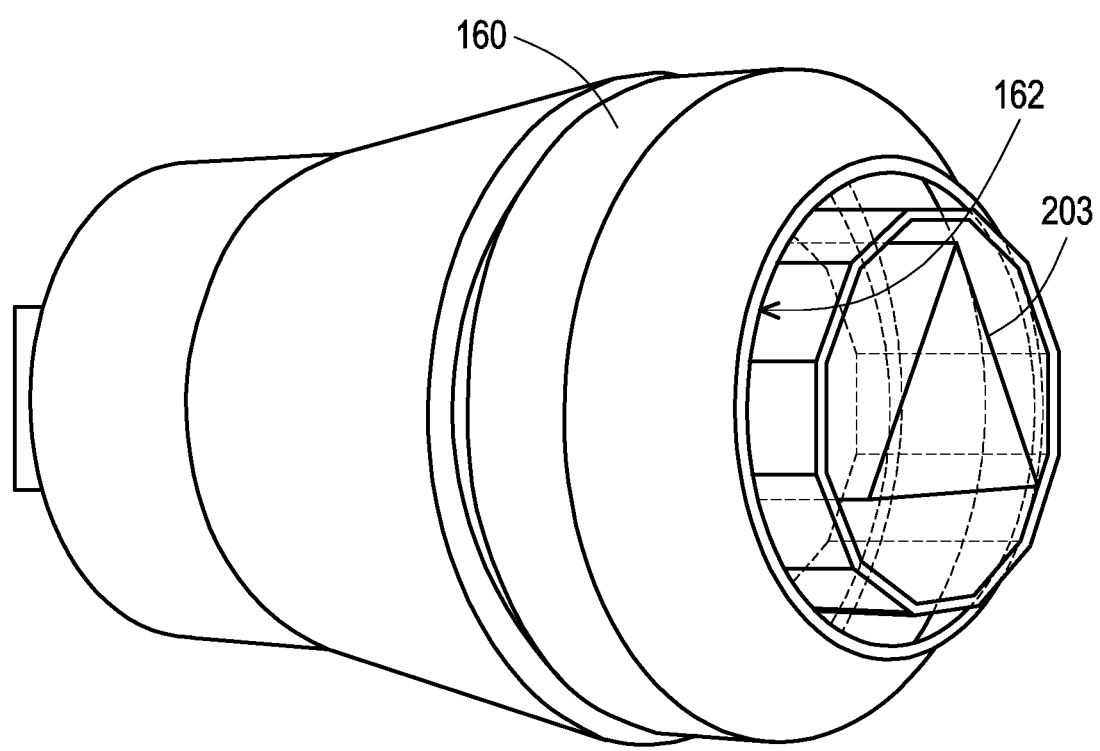
FIG. 4 is a three-dimensional schematic view illustrating a possible appearance of the switchable floating image display device of FIG. 1 and one of the floating images formed thereby.

FIG. 1 is a schematic view of a switchable floating image display device according to an embodiment of the disclosure, FIG. 2A is a schematic view of a light-emitting stack layer of FIG. 1 when light is emitted, FIG. 2B is a schematic view of a light-emitting pattern stack layer of FIG. 1 when light is emitted, FIG. 3A is a schematic view of a first floating image and a finger of a user provided when the light-emitting stack layer emits light, FIG. 3B is a schematic view of a second floating image and the finger of the user provided when the light-emitting pattern stack layer emits light, and FIG. 4 is a three-dimensional schematic view illustrating a possible appearance of the switchable floating image display device of FIG. 1 and one of the floating images formed thereby. Please refer to FIG. 1 to FIG. 4. A switchable floating image display device 100 of the embodiment includes a light-emitting stack layer 200, a light-emitting pattern stack layer 300, a transparent barrier layer 110, an optical imaging module 120, and a power supply module 130. The light-emitting stack layer 200 is configured to generate a first pattern beam 202, and the light-emitting pattern stack layer 300 is configured to generate a second pattern beam 302. In the embodiment, the light-emitting stack layer 200 may generate a light-emitting pattern 201 as shown in FIG. 2A, and the light-emitting stack layer 300 may generate a light-emitting pattern 301 as shown in FIG. 2B. The light-emitting patterns 201 and 301 in FIG. 2A and FIG. 2B are only schematically shown. In fact, in an embodiment, the light-emitting patterns 201 and 301 may be designed as complex light-emitting patterns, that is, various regular or irregular light-emitting patterns according to requirements.

The transparent barrier layer 110 is disposed between the light-emitting stack layer 200 and the light-emitting pattern stack layer 300 to block electrical communication between the light-emitting stack layer 200 and the light-emitting pattern stack layer 300, wherein the transparent barrier layer 110 is, for example, a transparent insulating layer, and the material thereof may be silicon oxide, silicon nitride, epoxy resin, silicon glue, or other suitable insulating materials. The optical imaging module 120 is configured to enable the first pattern beam 202 to form a first floating image (for example, a first floating image 203 shown in FIG. 3A), and enable the second pattern beam 302 to form a second floating image (for example, a second floating image 303 shown in FIG. 3B). In the embodiment, the optical imaging module 120 is, for example, a lens array, which may have multiple microlenses 122 arranged into a two-dimensional array, so that the first pattern beam 202 and the second pattern beam 302 form the first floating image and the second floating image, wherein the first floating image and the second floating image are light field images. In other words, the optical imaging module 120 reconstructs the traveling directions and the intensities of the first pattern beam 202 and the second pattern beam 302 to form multiple intersection points of light rays in a three-dimensional space in front of the optical imaging module 120. The intersection points simulate light reflected from a surface of a real object. When the light is transmitted to the eyes of a user, the user feels that there is a three-dimensional floating image (that is, the first floating image and the second floating image) simulating the three-dimensional real object in the space. The light-emitting pattern 201 generated by the light-emitting stack layer 200 and the light-emitting pattern 301 generated by the light-emitting stack layer 300 are matched with the optical imaging module 120, and the first pattern beam 202 and the second pattern beam 302 are reconstructed by the optical imaging module 120 to form expected light field images. The light-emitting patterns 201 and 301 in FIG. 2A and FIG. 2B are only schematically shown. In fact, when the light field images (that is, the first floating image 203 and the second floating image 303) as shown in FIG. 3A and FIG. 3B are to be formed, the light-emitting patterns 201 and 301 corresponding to the optical imaging module 120 are more complicated than as shown in FIG. 2A and FIG. 2B. However, in order to simplify the drawings to help understanding, the light-emitting patterns of the light-emitting stack layer 200 and the light-emitting pattern stack layer 300 in the following embodiments are all simplified drawings, but in practical applications, there will be more complicated patterns that are matched with the optical imaging module 120.

In the embodiment, the first floating image 203 and the second floating image 303 are, for example, three-dimensional images. However, in other embodiments, the first floating image 203 or the second floating image 303 may also be planar images.

In addition to being a lens array, in other embodiments, the optical imaging module 120 may include a grating, a photonic crystal, an optical fiber, etc. The optical elements can also reconstruct the traveling directions and the intensities of the first pattern beam 202 and the second pattern beam 302 to form the light field images.

The power supply module 130 is electrically connected to the light-emitting stack layer 200 and the light-emitting pattern stack layer 300, and is configured to determine whether to generate the first floating image or the second floating image by switching between the light-emitting stack layer 200 and the light-emitting pattern stack layer 300 to emit light. The first floating image and the second floating image may have different shapes, distribution ranges, colors, brightness, or combinations thereof.

Figure 5:
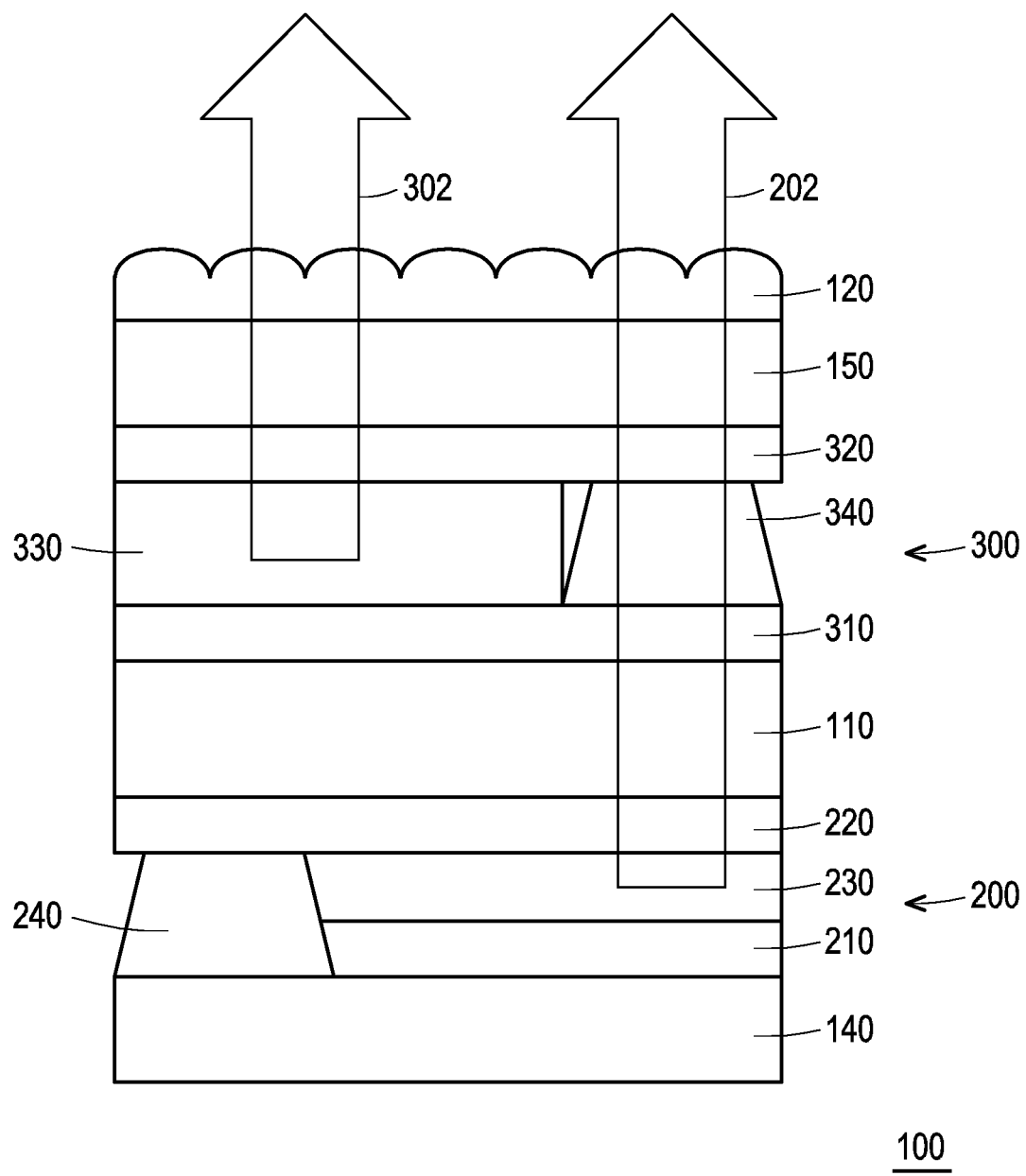
FIG. 5 is a cross-sectional schematic view of a detailed structure of the switchable floating image display device of FIG. 1.

FIG. 5 is a cross-sectional schematic view of a detailed structure of the switchable floating image display device of FIG. 1. Please refer to FIG. 1 and FIG. 5. The light-emitting stack layer 200 includes a first electrode 210, a second electrode 220, and a first patterned light-emitting layer 230, wherein the first patterned light-emitting layer 230 is disposed between the first electrode 210 and the second electrode 220, and is configured to form the first pattern beam 202. The light-emitting pattern stack layer 300 includes a third electrode 310, a fourth electrode 320, and a second patterned light-emitting layer 330, wherein the second patterned light-emitting layer 330 is disposed between the third electrode 310 and the fourth electrode 320, and is configured to form the second pattern beam 302. In the embodiment, the second electrode 220, the third electrode 310, and the fourth electrode 320 may be transparent electrodes, so that the first pattern beam 202 and the second pattern beam 302 can pass through. In the embodiment, the materials of the second electrode 220, the third electrode 310, and the fourth electrode 320 may be, for example, indium tin oxide (ITO) or other transparent conductive materials. The material of the first electrode 210 may be metal or a transparent conductive material. In other words, the first electrode 210 may be an opaque electrode or a transparent electrode.

In the embodiment, the light-emitting stack layer 200 may further include a first pattern defining layer 240, for example, configured to define the patterns of the first patterned light-emitting layer 230 and the first electrode 210. The light-emitting pattern stack layer 300 may further include a second pattern defining layer 340, for example, disposed between the third electrode 310 and the fourth electrode 320, and configured to define the pattern of the second patterned light-emitting layer 330. The pattern of the first pattern defining layer 240 and the patterns of the first patterned light-emitting layer 230 and the first electrode 210 may, for example, be complementary patterns. The pattern of the second pattern defining layer 340 and the pattern of the second patterned light-emitting layer 330 may, for example, be two complementary patterns. The second pattern defining layer 340 may be formed of a transparent insulating material, which is beneficial for allowing the first pattern beam 202 to pass through. The first pattern defining layer 240 may be formed of an insulating material, which includes a transparent insulating material or an opaque insulating material. In addition, in the embodiment, the light-emitting pattern stack layer 300 is disposed between the light-emitting stack layer 200 and the optical imaging module 120. The optical imaging module 120 may be attached onto the light-emitting pattern stack layer 300 or formed thereon by a lithography process.

In the embodiment, the first patterned light-emitting layer 230 and the second patterned light-emitting layer 330 are, for example, organic light-emitting layers of organic light-emitting diodes, and three-dimensional graphics are written to form an imaging sheet with a fixed pattern. The imaging sheet reconstructs the light field image by the optical imaging module 120. The switchable floating image display device 100 of the embodiment may not adopt a display with pixels and a changeable screen, but adopt selective light emission of at least one imaging sheet with a specific pattern to switch the floating image. The switchable floating image display device 100 of the embodiment may have advantages such as simple structure and switchable floating image. In addition, the switchable floating image display device 100 of the embodiment does not require panel pixel level process technology, and does not require a driving integrated circuit for driving pixels. In addition to reducing costs, the manufacturing of the imaging sheet is easier to be customized according to field requirements. In addition, it is not necessary to adopt a panel with pixels, and the volume of the switchable floating image display device 100 of the embodiment may be smaller.

In the embodiment, the switchable floating image display device 100 may further include a substrate 140. During the manufacturing of the switchable floating image display device 100 of the embodiment, the light-emitting stack layer 200, the transparent barrier layer 110, and the light-emitting pattern stack layer 300 may be formed on the substrate 140 using, for example, a lithography process. The transparent barrier layer 110 may also have a barrier effect to prevent damage to the light-emitting stack layer 200 during the lithography process of the light-emitting pattern stack layer 300. In addition, in the embodiment, the switchable floating image display device 100 may further include another transparent barrier layer 150 disposed between the light-emitting pattern stack layer 300 and the optical imaging module 120 to protect the light-emitting pattern stack layer 300. The material of the substrate 140 may be glass or other suitable materials.

Please refer to FIG. 1 and FIG. 4 again. The switchable floating image display device 100 of the embodiment may further include a case 160. The case 160 may encapsulate the light-emitting stack layer 200, the transparent barrier layer 110, and the light-emitting pattern stack layer 300, and cover a side surface of the optical imaging module 120. In addition, the case 160 may have an opening 162 exposing one surface (for example, an upper surface) of the optical imaging module 120, so that the first pattern beam 202 and the second pattern beam 302 can pass through. In this way, the first floating image 203 and the second floating image 303 may be formed outside the case 160 or at the opening 162. The case 160 may further include a sensor, such as a proximity sensor or a distance sensor. As shown in FIG. 3A and FIG. 3B, when the sensor senses that a finger 50 of the user is approaching and is located at the position of the first floating image 203, after the processor inside the switchable floating image display device 100 receives a signal from the sensor, the power supply module 130 may be instructed to switch from a state of enabling the light-emitting stack layer 200 to emit light to generate the first floating image 203 (as shown in FIG. 3A) to a state of enabling the light-emitting pattern stack layer 300 to emit light to generate the second floating image 303 (as shown in FIG. 3B), wherein the first floating image 203 is, for example, a virtual key image that is not pressed and is more protruding, and the second floating image 303 is, for example, a virtual key image that is pressed and is less protruding. In this way, the user can visually feel that after being pressed by the finger, the virtual key image is converted from a state of not being pressed and being more protruding (as shown in the first floating image 203 in FIG. 3A) to a state of being pressed and being less protruding (as shown in the second floating image 303 in FIG. 3B). In this way, the switchable floating image display device 100 of the embodiment can achieve the interaction between the floating image and the user. In other words, the switchable floating image display device 100 of the embodiment can realize non-contact interface technology, and the user does not need to actually contact the surface of the object, which can prevent residual body fluids to destroy the path for indirect contact infection.

In the embodiment, the power supply module 130 may include a combinational logic circuit, a gate, a relay, a switching element, other electronic elements, or a combination thereof. Please refer to FIG. 1 and FIG. 5 again. When the switchable floating image display device 100 is switched to a state of the light-emitting stack layer 200 emitting light, a first switching element 132 in the power supply module 130 is turned on, and a second switching element 134 is turned off, so that a voltage difference is applied between the first electrode 210 and the second electrode 220, but no voltage difference is applied between the third electrode 310 and the fourth electrode 320. At this time, the light-emitting stack layer 200 emits light to generate the first floating image, and the light-emitting pattern stack layer 300 does not emit light. When the switchable floating image display device 100 is switched to a state of the light-emitting pattern stack layer 300 emitting light, the first switching element 132 in the power supply module 130 is turned off, and the second switching element 134 is turned on, so that a voltage difference is applied between the third electrode 310 and the fourth electrode 320, but no voltage difference is applied between the first electrode 210 and the second electrode 220. At this time, the light-emitting pattern stack layer 300 emits light to generate the second floating image, and the light-emitting stack layer 200 does not emit light.

In the embodiment, two light-emitting patterns are formed by the light-emitting stack layer 200 and the light-emitting pattern stack layer 300 as an example, but the disclosure is not limited thereto. In other embodiments, the switchable floating image display device 100 may have 2, 3, 4, 5, or more light-emitting pattern stack layers with different patterns, which are stacked together with the light-emitting stack layer 200 to form more than three light-emitting patterns, so that more than three different floating images can be formed.

Figure 6:
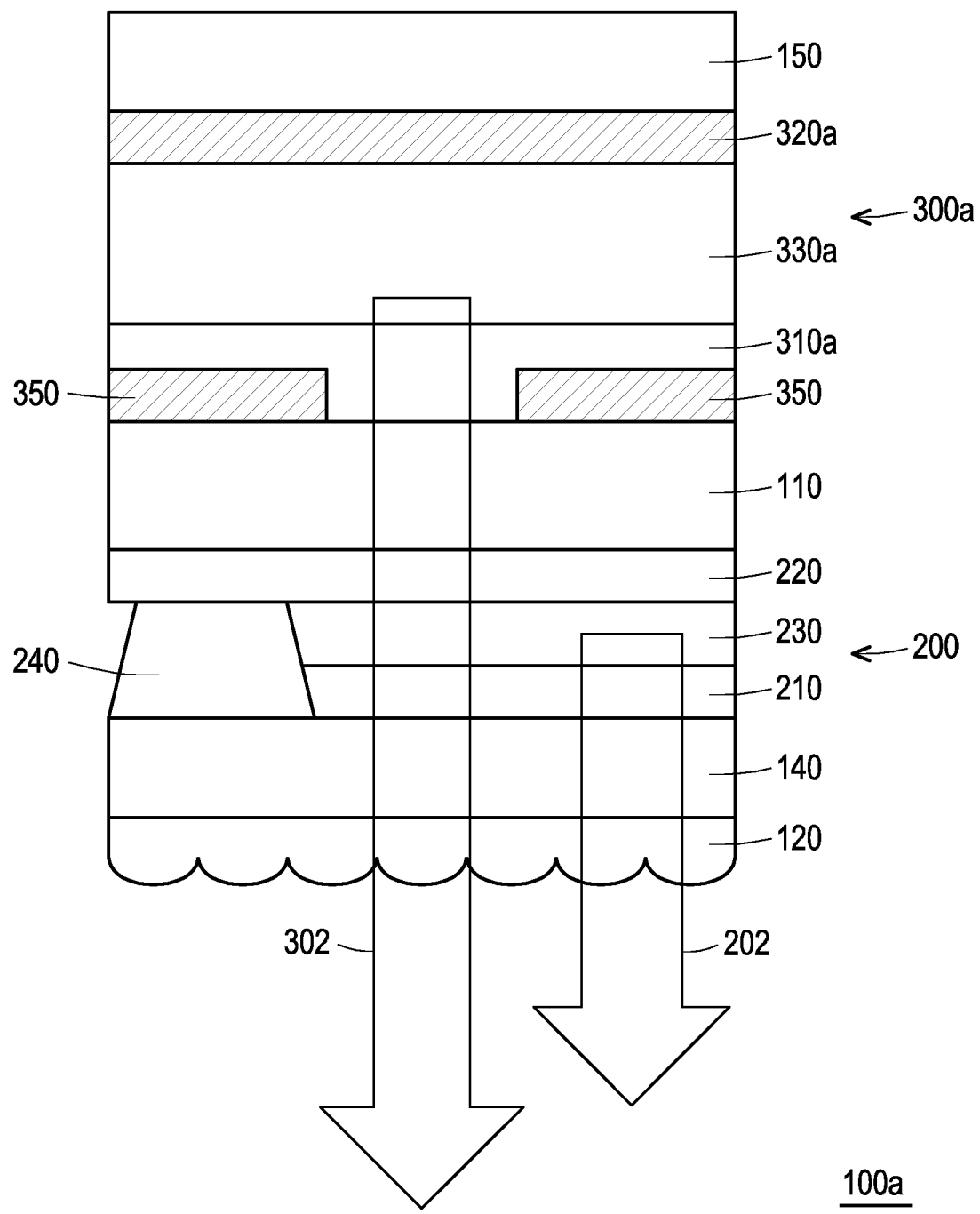
FIG. 6 is a cross-sectional schematic view of a detailed structure of a switchable floating image display device according to another embodiment of the disclosure.

FIG. 6 is a cross-sectional schematic view of a detailed structure of a switchable floating image display device according to another embodiment of the disclosure. Please refer to FIG. 6. A switchable floating image display device 100a of the embodiment is similar to the switchable floating image display device 100 of FIG. 5, but in a light-emitting pattern stack layer 300a of the embodiment, a third electrode 310a is a transparent electrode, and a fourth electrode 320a is a reflective layer. The material of the third electrode 310a is, for example, indium tin oxide or other transparent conductive materials, and the material of the fourth electrode 320a is, for example, metal. The light-emitting layer 330a is disposed between the third electrode 310a and the fourth electrode 320a, and is, for example, an organic light-emitting layer of an organic light-emitting diode with the entire surface coated and without being patterned. In the embodiment, the light-emitting pattern stack layer 300a further includes a patterned light-shielding layer 350 covering a part of the surface of the third electrode 310a, wherein light emitted by the light-emitting layer 330a passes through a part of the third electrode 310a not shielded by the patterned light-shielding layer 350 to form the second pattern beam 302. In the embodiment, the light emitted upward from the light-emitting layer 330a is reflected downward by the fourth electrode 320a, and the light-emitting layer 330a also emits light downward, and the light reflected downward and emitted downward passes through the part of the electrode 310a not shielded by the patterned light-shielding layer 350 to form the second pattern beam 302 transmitted downward. In the embodiment, the patterned light-shielding layer 350 is a patterned metal layer. However, in other embodiments, the patterned light-shielding layer 350 may also be a patterned insulating layer.

In the embodiment, the light-emitting stack layer 200 is disposed between the light-emitting pattern stack layer 300a and the optical imaging module 120, and the substrate 140 is, for example, a transparent substrate. After the second pattern beam 302 transmitted downward passes through the transparent barrier layer 110, the light-emitting stack layer 200, the substrate 140, and the optical imaging module 120, a second floating image is formed under the optical imaging module 120. On the other hand, after the first pattern beam 202 emitted by the first patterned light-emitting layer 230 passes through the first electrode 210, the substrate 140, and the optical imaging module 120, a first floating image is formed under the optical imaging module 120. In the embodiment, the first electrode 210 and the second electrode 220 may be transparent electrodes.

Figure 7:
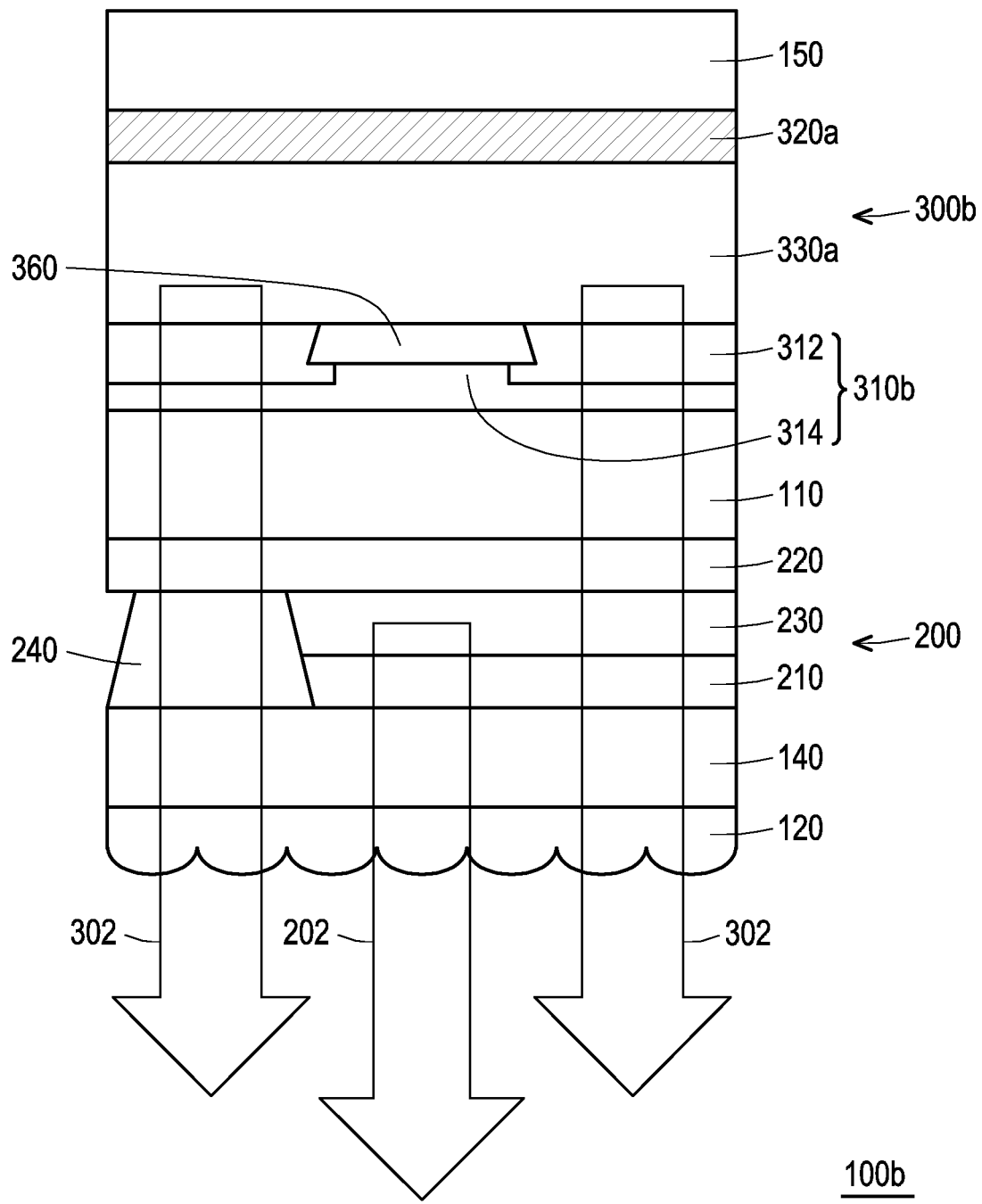
FIG. 7 is a cross-sectional schematic view of a detailed structure of a switchable floating image display device according to yet another embodiment of the disclosure.

FIG. 7 is a cross-sectional schematic view of a detailed structure of a switchable floating image display device according to yet another embodiment of the disclosure. Please refer to FIG. 7. A switchable floating image display device 100b of the embodiment is similar to the switchable floating image display device 100a of FIG. 6, but a light-emitting pattern stack layer 300b of the embodiment may include a pattern defining layer 360 covering a part of the surface of a third electrode 310b facing the light-emitting layer 330a, wherein the pattern defining layer 360 is an insulating layer, which may be a transparent insulating layer or an opaque insulating layer. The third electrode 310b includes a patterned electrode part 312 and a conductive part 314. The pattern of the patterned electrode part 312 may be defined by the pattern defining layer 360, that is, the pattern of the patterned electrode part 312 and the pattern of the pattern defining layer 360 may be two complementary patterns, wherein the shape and the configuration of the pattern defining layer 360 may be adjusted according to requirements. The patterned electrode part 312 and the pattern defining layer 360 are disposed on the surface of the conductive part 314 facing the light-emitting layer 330a.

A part of the light-emitting layer 330a above the pattern defining layer 360 does not emit light due to the lack of conductive current, and the remaining part (that is, the part above the patterned electrode part 312) of the light-emitting layer 330a emits the second pattern beam 302 passing through the third electrode 310b since there is a conductive current when a voltage difference is applied between the third electrode 310b and the fourth electrode 320a. Then, after passing through the transparent barrier layer 110, the light-emitting stack layer 200, the substrate 140, and the optical imaging module 120, the second pattern beam 302 forms a second floating image below the optical imaging module 120. In the embodiment, the materials of the patterned electrode part 312 and the conductive part 314 are, for example, indium tin oxide or other transparent conductive materials.

In another embodiment, the light-emitting pattern stack layer 300b may include a patterned third electrode 310b (that is, the patterned electrode part 312). A part of the light-emitting layer 330a corresponding to above the patterned electrode part 312 emits the second pattern beam 302 passing through the patterned third electrode 310b since there is a conductive current when a voltage difference is applied between the patterned third electrode 310b and the fourth electrode 320a. After continuously passing through the patterned third electrode 310b, the second pattern beam 302 forms a second floating image under the optical imaging module 120.

Figure 8:
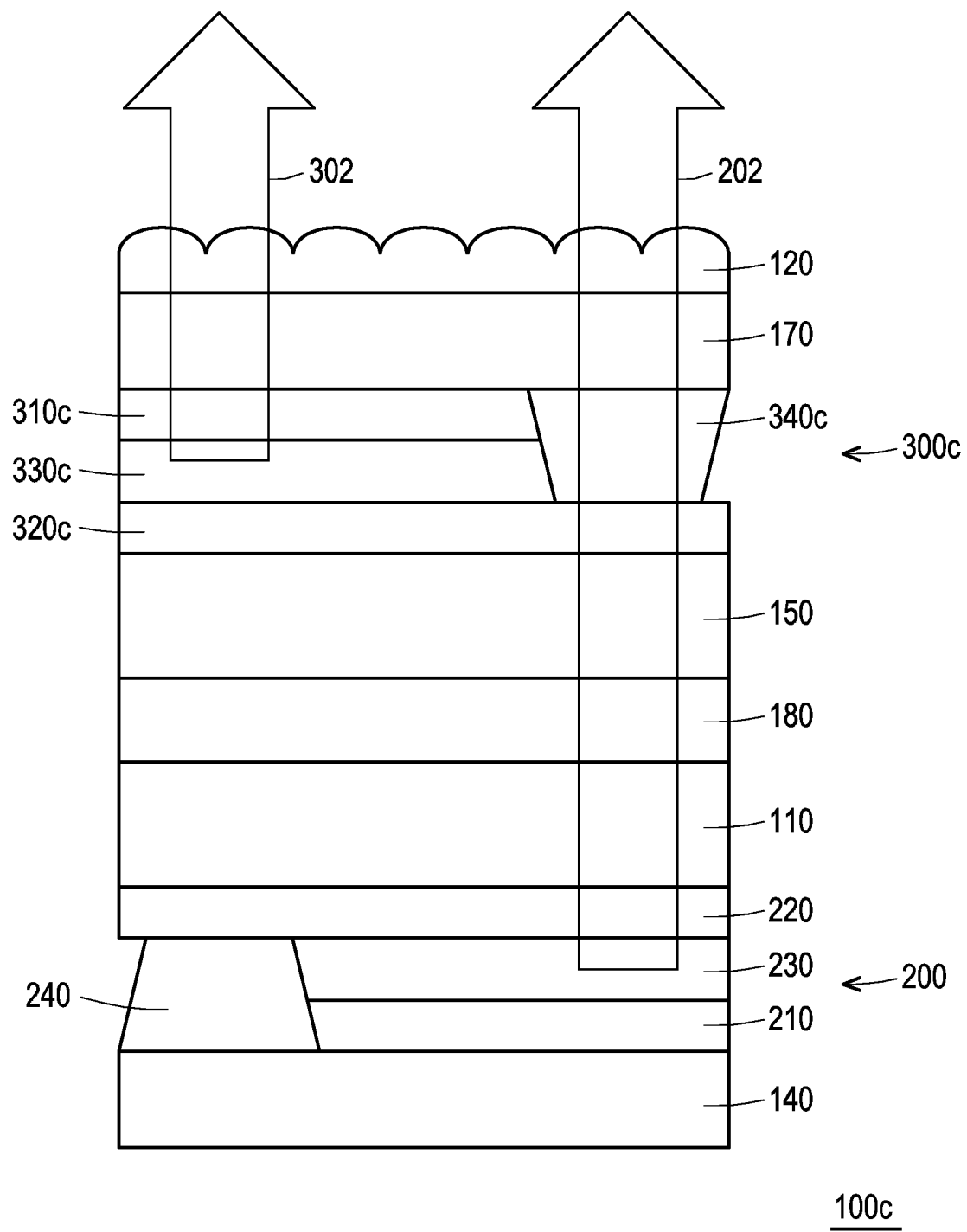
FIG. 8 is a cross-sectional schematic view of a detailed structure of a switchable floating image display device according to still another embodiment of the disclosure.

FIG. 8 is a cross-sectional schematic view of a detailed structure of a switchable floating image display device according to still another embodiment of the disclosure. Please refer to FIG. 8. A switchable floating image display device 100c of the embodiment is similar to the switchable floating image display device 100 of FIG. 5, but the switchable floating image display device 100c of the embodiment further includes a substrate 170, another transparent barrier layer 150, and a bonding layer 180. The substrate 170 is disposed between a light-emitting pattern stack layer 300c and the optical imaging module 120, wherein the substrate 170 is, for example, a transparent substrate. The transparent barrier layer 150 is disposed between the light-emitting pattern stack layer 300c and the transparent barrier layer 110, wherein the transparent barrier layer 150 is, for example, a transparent insulating layer. The bonding layer 180 is bonded to the transparent barrier layer 110 and the transparent barrier layer 150.

In the embodiment, a third electrode 310c is disposed between a fourth electrode 320c and the optical imaging module 120, and a second patterned light-emitting layer 330c is disposed between the third electrode 310c and the fourth electrode 320c. A second pattern defining layer 340c is disposed between the third electrode 310c and the fourth electrode 320c, and is configured to define the pattern of the second patterned light-emitting layer 330c. In addition, the transparent barrier layer 150 is disposed between the bonding layer 180 and the fourth electrode 320c. In the embodiment, the third electrode 310c and the fourth electrode 320c may both be transparent electrodes, and the materials thereof are, for example, indium tin oxide or other suitable transparent conductive materials. Therefore, the third electrode 310c and the fourth electrode 320c may allow the first pattern beam 202 and the second pattern beam 302 to pass through.

When manufacturing the switchable floating image display device 100c, the light-emitting stack layer 200 and the light-emitting stack layer 300c may be respectively formed on the substrate 140 and the substrate 170 by a lithography process, and the transparent barrier layer 110 and the transparent barrier layer 150 are respectively formed on the light-emitting stack layer 200 and the light-emitting stack layer 300c. Next, the light-emitting stack layer 300c together with the substrate 170 and the transparent barrier layer 150 are placed upside down on the light-emitting stack layer 200, and the transparent barrier layer 110 and the transparent barrier layer 150 are bonded with the bonding layer 180. In the embodiment, the bonding layer 180 may be a transparent adhesive layer, such as optical clear adhesive (OCA). In this way, when the light-emitting stack layer 300c is manufactured by the lithography process, the light-emitting stack layer 200 is not affected.

Figure 9:
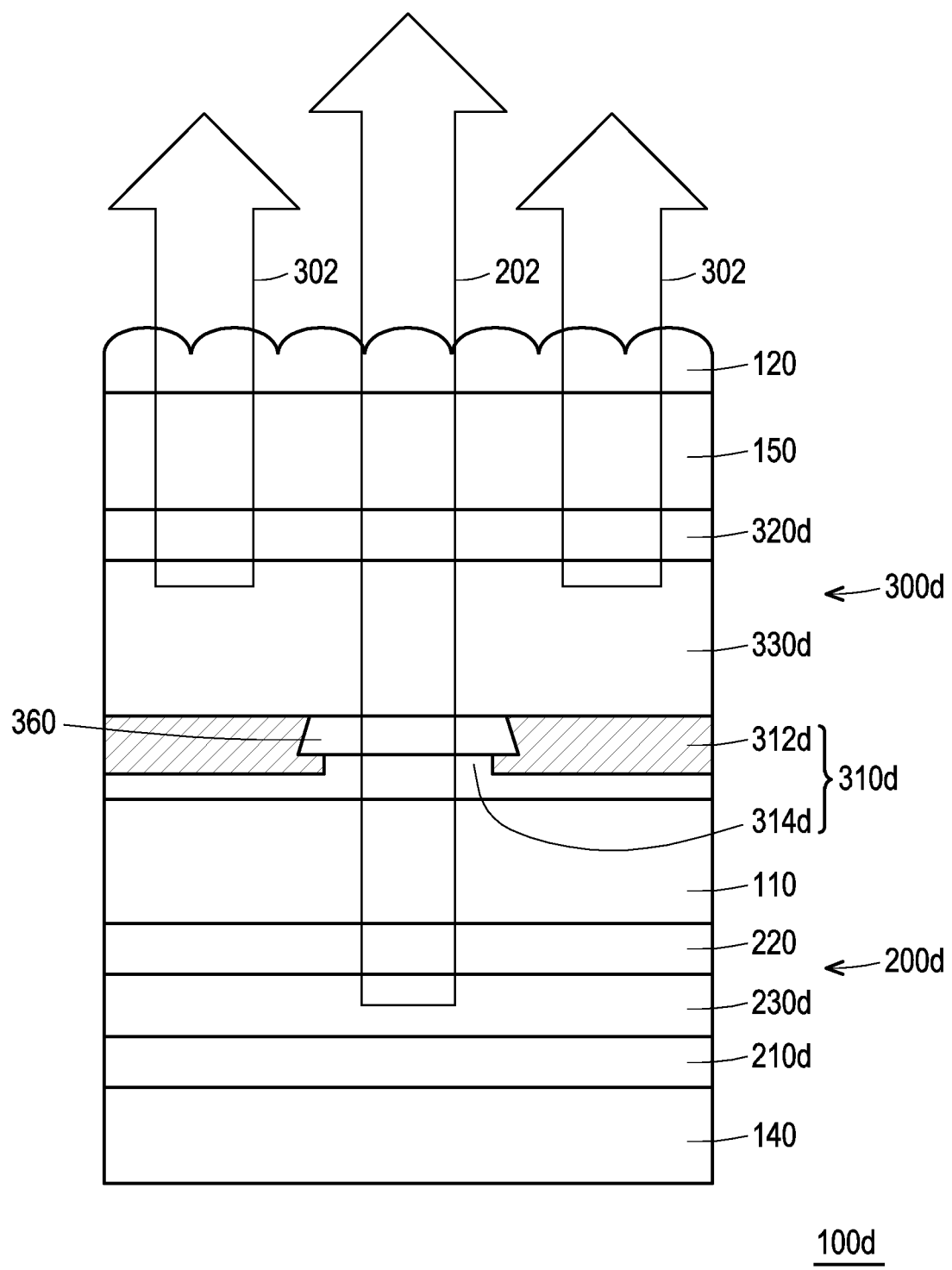
FIG. 9 is a cross-sectional schematic view of a detailed structure of a switchable floating image display device according to another embodiment of the disclosure.

FIG. 9 is a cross-sectional schematic view of a detailed structure of a switchable floating image display device according to another embodiment of the disclosure. Please refer to FIG. 9. A switchable floating image display device 100d of the embodiment is similar to the switchable floating image display device 100 of FIG. 5, but a light-emitting stack layer 200d of the embodiment may include a first electrode 210d, the second electrode 220, and a first light-emitting layer 230d, wherein the first light-emitting layer 230d is disposed between the first electrode 210d and the second electrode 220. In the embodiment, the first electrode 210d, the second electrode 220, and the first light-emitting layer 230d are all film layers with entire surface distribution and without being patterned, which may be regarded as surface light sources.

The light-emitting pattern stack layer 300d includes a third electrode 310d, the pattern defining layer 360, a fourth electrode 320d, and a second light-emitting layer 330d. The third electrode 310d includes a transparent conductive layer 314d and a patterned metal electrode layer 312d. The patterned metal electrode layer 312d is disposed on the transparent conductive layer 314d. The pattern defining layer 360 is disposed on the transparent conductive layer 314d and is configured to define the pattern of the patterned metal electrode layer 312d. The pattern of the pattern defining layer 360 and the pattern of the patterned metal electrode layer 312d are, for example, two complementary patterns. The pattern defining layer 360 may be a transparent insulating layer. Light emitted by the first light-emitting layer 230d is shielded by the patterned metal electrode layer 312d and passes through the pattern defining layer 360 to form the first pattern beam 202. The second light-emitting layer 330d is disposed between the third electrode 310d and the fourth electrode 320d, wherein a part of the second light-emitting layer 330d on the pattern defining layer 360 does not emit light due to the insulating function of the pattern defining layer 360, and a part of the second light-emitting layer 330d on the patterned metal electrode layer 312d emits the second pattern beam 302 due to a voltage difference between the patterned metal electrode layer 312d and the fourth electrode 320d.

In another embodiment, the light-emitting pattern stack layer 300d may include the patterned third electrode 310d (that is, the patterned metal electrode layer 312d). A part of the light-emitting layer 330d corresponding to above the patterned metal electrode layer 312d emits the second pattern beam 302 passing through the fourth electrode 320d since there is a conductive current when a voltage difference is applied between the patterned third electrode 310d and the fourth electrode 320d, and after passing through the optical imaging module 120, the second pattern beam 302 forms a second floating image.

In the embodiment, the second light-emitting layer 330d is a film layer with entire surface distribution and without being patterned, and only the part above the patterned metal electrode layer 312d emits light to form a light-emitting pattern. On the other hand, light emitted by the first light-emitting layer 230d sequentially passes through the transparent conductive layer 314d and the pattern defining layer 360 to form another light-emitting pattern. Therefore, the light-emitting pattern formed by the first light-emitting layer 230d and the light-emitting pattern formed by the second light-emitting layer 330d may be complementary patterns to each other. After the first pattern beam 202 and the second pattern beam 302 pass through the optical imaging module 120, complementary first floating image and second floating image are formed.

In the switchable floating image display device 100d of the embodiment, the first light-emitting layer 230d and the second light-emitting layer 330d do not need to undergo patterning processing, which is beneficial for simplifying the manufacturing process and reducing the manufacturing cost.

Figure 10:
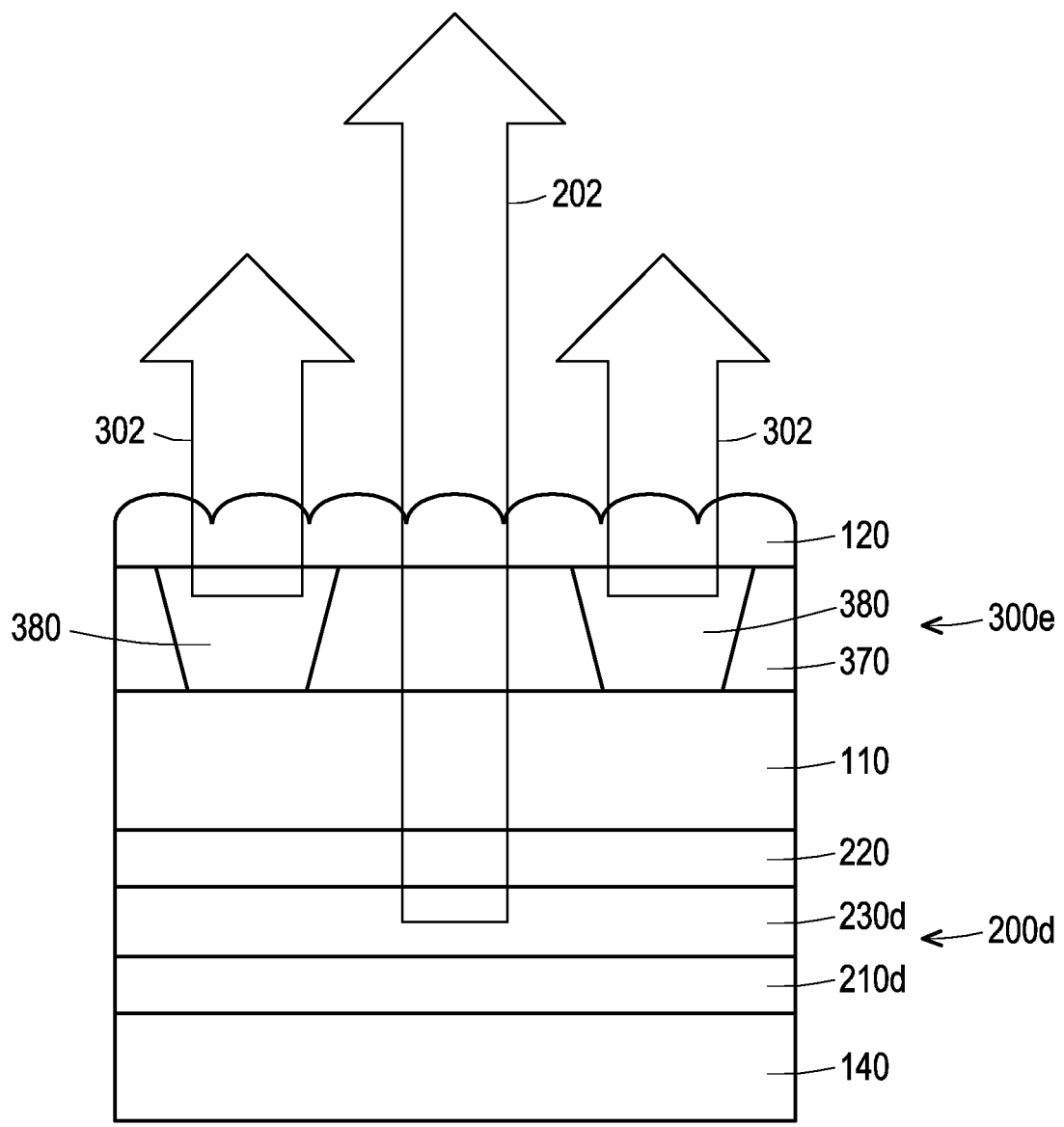
FIG. 10 is a cross-sectional schematic view of a detailed structure of a switchable floating image display device according to yet another embodiment of the disclosure.

FIG. 10 is a cross-sectional schematic view of a detailed structure of a switchable floating image display device according to yet another embodiment of the disclosure. Please refer to FIG. 10. A switchable floating image display device 100e of the embodiment is similar to the switchable floating image display device 100d of FIG. 9, but a light-emitting pattern stack layer 300e of the embodiment includes a transparent insulating layer 370 and multiple micro-light-emitting diodes (micro-LEDs) 380. The micro-LEDs 380 may be embedded in the transparent insulating layer 370, arranged into a pattern, and configured to emit the second pattern beam 302. In other words, semiconductor stack layers and metal electrodes of the micro-LEDs 380 are disposed in the transparent insulating layer 370. On the other hand, light emitted by the first light-emitting layer 230d is shielded by the micro-LEDs 380 (for example, shielded by the metal electrodes of the micro-LEDs 380), and passes through a region of the transparent insulating layer 370 without the micro-LEDs 380 to form the first pattern beam 202. In other words, a light-emitting pattern emitting the first pattern beam 202 (that is, corresponding to the region in the transparent insulating layer 370 without the micro-LEDs 380) and a light-emitting pattern emitting the second pattern beam 302 (that is, the pattern formed by the micro-LEDs 380) may be complementary, so the first floating image formed by the first pattern beam 202 and the second floating image formed by the second pattern beam 302 may also be two complementary images.

Figure 11:
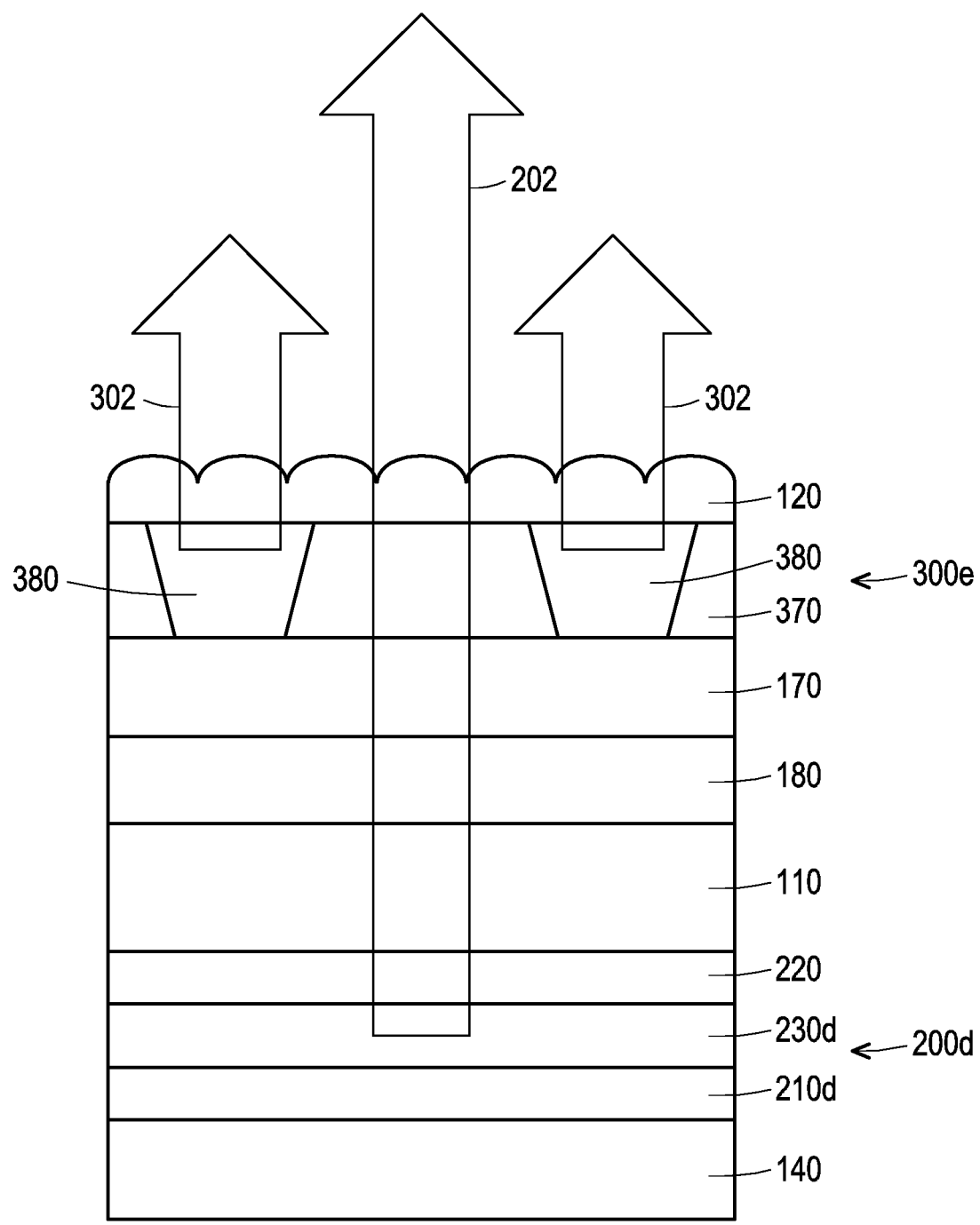
FIG. 11 is a cross-sectional schematic view of a detailed structure of a switchable floating image display device according to yet another embodiment of the disclosure.

FIG. 11 is a cross-sectional schematic view of a detailed structure of a switchable floating image display device according to yet another embodiment of the disclosure. Please refer to FIG. 11. A switchable floating image display device 100f of the embodiment is similar to the switchable floating image display device 100e of FIG. 10, but the switchable floating image display device 100f of the embodiment further includes the substrate 170 and the bonding layer 180, wherein the substrate 170 is disposed between the transparent barrier layer 110 and a light-emitting pattern stack layer 300e, and the bonding layer 180 is bonded to the transparent barrier layer 110 and the substrate 170. In the embodiment, the light-emitting stack layer 200d and the light-emitting pattern stack layer 300e may be respectively formed on the substrate 140 and the substrate 170, and the two are then bonded together by the bonding layer 180.

Figure 12A:
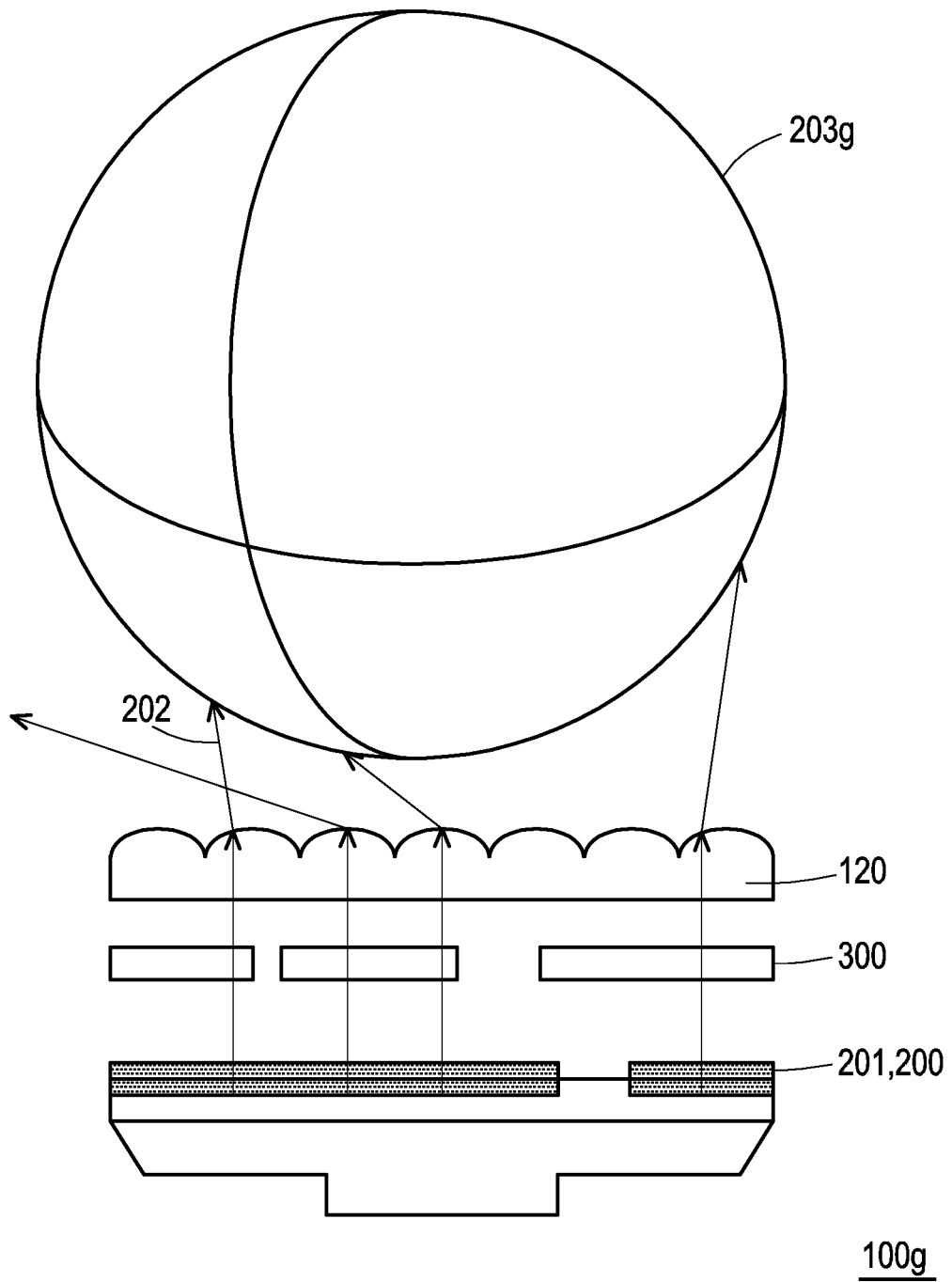
FIG. 12A is a schematic view of a light-emitting stack layer of a switchable floating image display device when light is emitted according to still another embodiment of the disclosure.
Figure 12B:
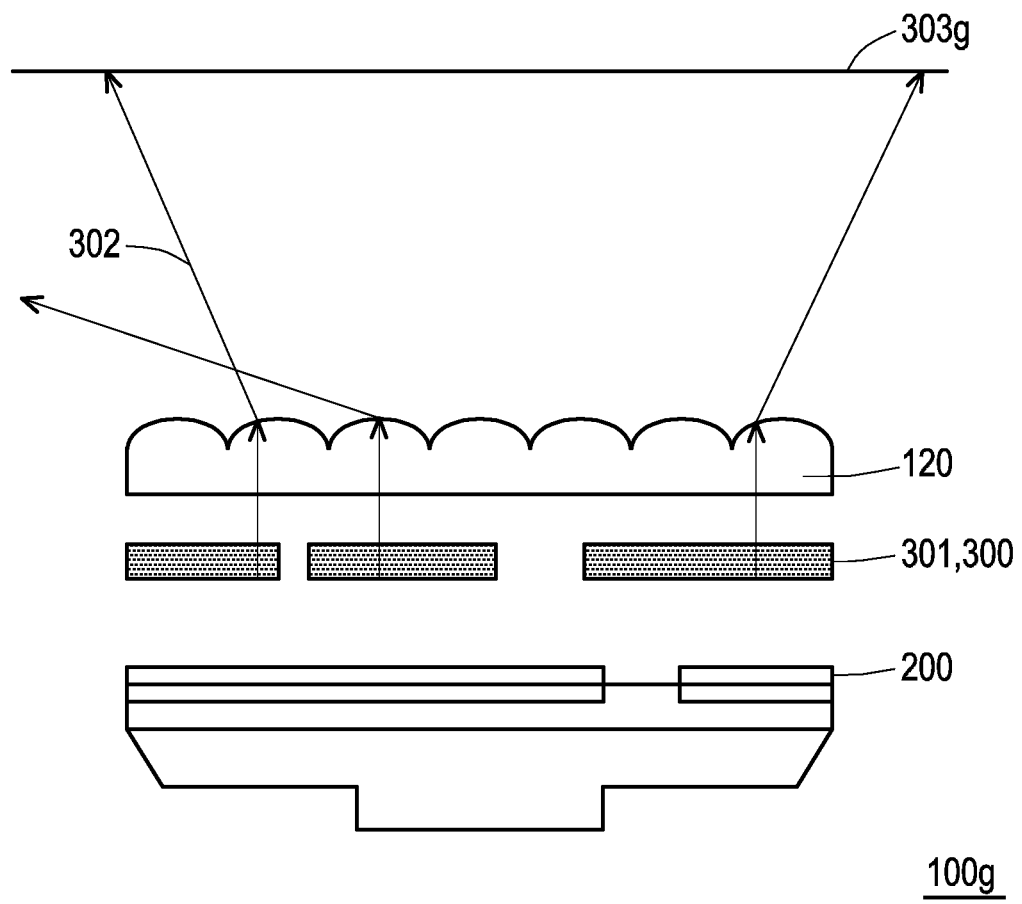
FIG. 12B is a schematic view of the light-emitting pattern stack layer of the switchable floating image display device of FIG. 12A when light is emitted.

FIG. 12A is a schematic view of a light-emitting stack layer of a switchable floating image display device when light is emitted according to still another embodiment of the disclosure, and FIG. 12B is a schematic view of the light-emitting pattern stack layer of the switchable floating image display device of FIG. 12A when light is emitted. Please refer to FIG. 12A and FIG. 12B. A switchable floating image display device 100g of the embodiment is similar to the switchable floating image display device 100 of FIG. 1, FIG. 2A, and FIG. 2B, but one of a first floating image 203g and a second floating image 303g may be a planar image, and the other one of the first floating image 203g and the second floating image 303g is a three-dimensional image (in FIG. 12A and FIG. 12B, the first floating image 203g is a three-dimensional image, and the second floating image 303g is a planar image as an example). In FIG. 12A, the light-emitting stack layer 200 may be designed to be configured to generate the light-emitting pattern 201, which may generate the three-dimensional first floating image 203g (a light field imaging pattern) together with the optical imaging module 120. In FIG. 12B, the light-emitting pattern stack layer 300 may be designed to be configured to generate a planar pattern (that is, the light-emitting pattern 301), which may generate the planar second floating image 303g together with the optical imaging module 120. Therefore, the switchable floating image display device 100g of the embodiment can achieve the switching of a two-dimensional image (that is, the second floating image 303g) and the three-dimensional image (the first floating image 203g).

Figure 13:
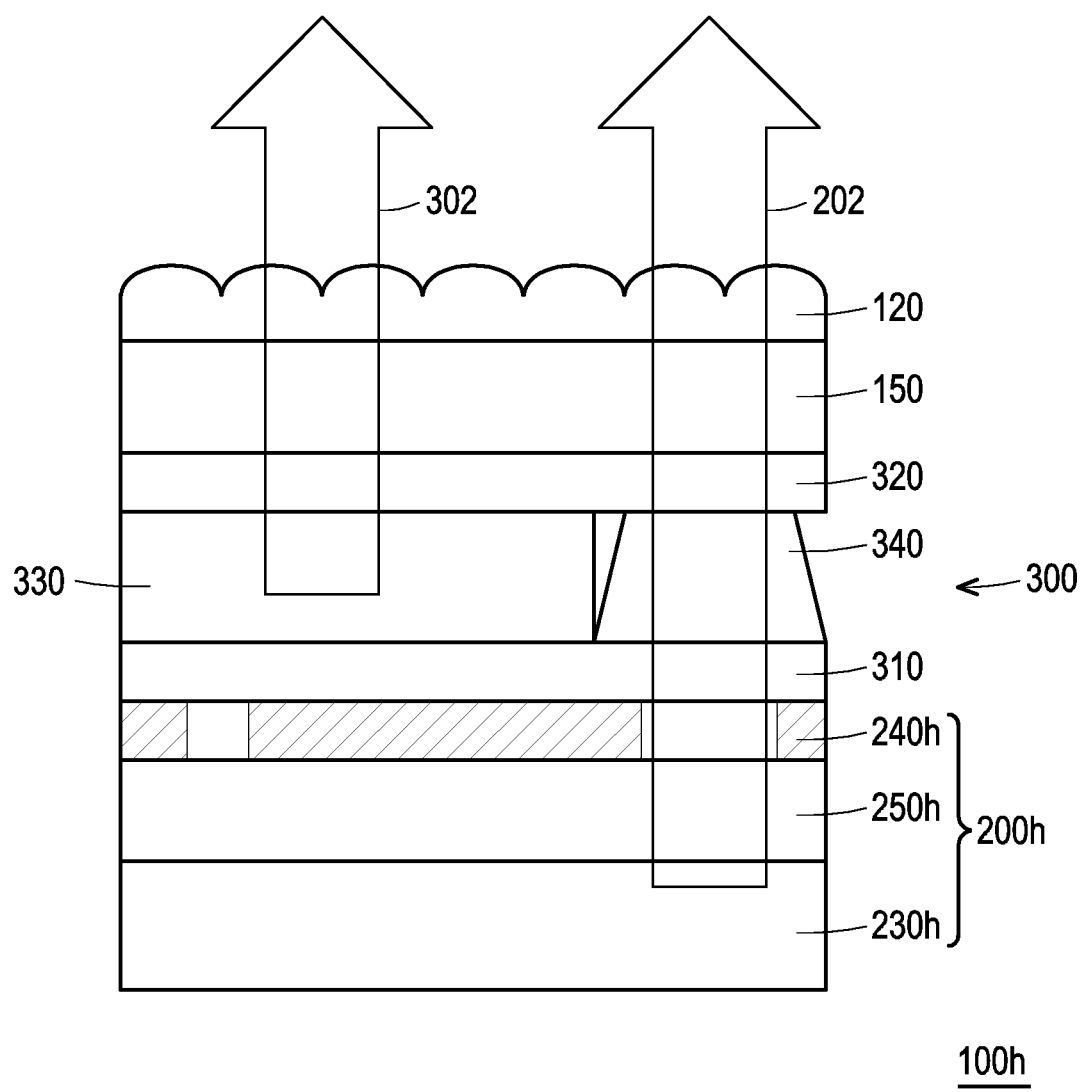
FIG. 13 is a cross-sectional schematic view of a switchable floating image display device according to another embodiment of the disclosure.

FIG. 13 is a cross-sectional schematic view of a switchable floating image display device according to another embodiment of the disclosure. Please refer to FIG. 13. A switchable floating image display device 100h of the embodiment is similar to the switchable floating image display device 100 of FIG. 5, but a light-emitting stack layer 200h of the embodiment may include a backlight source 230h and a patterned light-shielding layer 240h, wherein the patterned light-shielding layer 240h is disposed between the backlight source 230h and the light-emitting pattern stack layer 300. The patterned light-shielding layer 240h allows a part of the light emitted by the backlight source 230h to pass through and shields another part of the light emitted by the backlight source 230h to form the first pattern beam 202, and the first pattern beam 202 passes through the light-emitting pattern stack layer 300 to form a first floating image.

In the embodiment, the light-emitting stack layer 200h may further include a transparent substrate 250h disposed between the backlight source 230h and the patterned light-shielding layer 240h. The transparent substrate 250h may allow the light emitted by the backlight source 230h to pass through to reach the patterned light-shielding layer 240h. The patterned light-shielding layer 240h may be a patterned metal layer or a patterned non-metal shielding layer. The backlight source 230h is a one-sided light source, which may include a light-emitting diode, a panel light, a miniature light-emitting diode array, an organic light-emitting diode, etc. In addition, in other embodiments, more than two light-emitting pattern stack layers 300 may also be stacked to form more floating images.

In the switchable floating image display device according to an embodiment of the disclosure, the light-emitting stack layer and the light-emitting pattern stack layer are adopted to respectively generate the first pattern beam and the second pattern beam. The optical imaging module enables the first pattern beam to form the first floating image, and enables the second pattern beam to form the second floating image, and the power supply module determines whether to generate the first floating image or the second floating image by switching between the light-emitting stack layer and the light-emitting pattern stack layer to emit light. Therefore, the switchable floating image display device according to an embodiment of the disclosure may have advantages such as simple structure and switchable floating image.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A switchable floating image display device, comprising:
   a light-emitting stack layer, configured to generate a first pattern beam;
   a light-emitting pattern stack layer, configured to generate a second pattern beam;
   a transparent barrier layer, disposed between the light-emitting stack layer and the light-emitting pattern stack layer to block electrical communication between the light-emitting stack layer and the light-emitting pattern stack layer;
   an optical imaging module, configured to enable the first pattern beam to form a first floating image, and enable the second pattern beam to form a second floating image; and
   a power supply module, electrically connected to the light-emitting stack layer and the light-emitting pattern stack layer, and configured to determine whether to generate the first floating image or the second floating image by switching between the light-emitting stack layer and the light-emitting pattern stack layer to emit light, wherein the first floating image and the second floating image are light field images.

2. The switchable floating image display device according to claim 1, wherein the light-emitting stack layer comprises:
   a first electrode;
   a second electrode; and
   a first patterned light-emitting layer, disposed between the first electrode and the second electrode, and configured to form the first pattern beam,
   the light-emitting pattern stack layer comprises:
   a third electrode;
   a fourth electrode; and
   a second patterned light-emitting layer, disposed between the third electrode and the fourth electrode, and configured to form the second pattern beam, wherein the second electrode, the third electrode, and the fourth electrode are transparent electrodes.

3. The switchable floating image display device according to claim 2, wherein the light-emitting stack layer further comprises a first pattern defining layer configured to define patterns of the first patterned light-emitting layer and the first electrode, and the light-emitting pattern stack layer further comprises a second pattern defining layer disposed between the third electrode and the fourth electrode, and configured to define a pattern of the second patterned light-emitting layer.

4. The switchable floating image display device according to claim 1, wherein the light-emitting stack layer comprises:
   a first electrode;
   a second electrode; and
   a first patterned light-emitting layer, disposed between the first electrode and the second electrode, and configured to form the first pattern beam,
   the light-emitting pattern stack layer comprises:
   a third electrode, being a transparent electrode;
   a fourth electrode, being a reflective layer;
   a light-emitting layer, disposed between the third electrode and the fourth electrode; and
   a patterned light-shielding layer, covering a part of a surface of the third electrode, wherein light emitted by the light-emitting layer passes through a part of the third electrode not shielded by the patterned light-shielding layer to form the second pattern beam.

5. The switchable floating image display device according to claim 4, wherein the patterned light-shielding layer is a patterned metal layer.

6. The switchable floating image display device according to claim 1, wherein the light-emitting stack layer comprises:
a first electrode;
a second electrode; and
a first patterned light-emitting layer, disposed between the first electrode and the second electrode, and configured to form the first pattern beam,
the light-emitting pattern stack layer comprises:
a third electrode, being a transparent electrode;
a fourth electrode, being a reflective layer;
a light-emitting layer, disposed between the third electrode and the fourth electrode; and
a pattern defining layer, covering a part of a surface of the third electrode facing the light-emitting layer, wherein the pattern defining layer is an insulating layer, a part of the light-emitting layer above the pattern defining layer does not emit light, and a remaining part of the light-emitting layer emits the second pattern beam passing through the third electrode.

7. The switchable floating image display device according to claim 1, further comprising:
a first substrate, wherein the light-emitting stack layer is disposed on the first substrate;
a second substrate, disposed between the light-emitting pattern stack layer and the optical imaging module;
another transparent barrier layer, disposed between the light-emitting pattern stack layer and the transparent barrier layer; and
a bonding layer, bonded to the transparent barrier layer and the another transparent barrier layer.

8. The switchable floating image display device according to claim 1, wherein the light-emitting stack layer comprises:
a first electrode;
a second electrode; and
a first light-emitting layer, disposed between the first electrode and the second electrode,
the light-emitting pattern stack layer comprises:
a third electrode, comprising:
a transparent conductive layer; and
a patterned metal electrode layer, disposed on the transparent conductive layer;
a pattern defining layer, disposed on the transparent conductive layer and configured to define a pattern of the patterned metal electrode layer, wherein the pattern defining layer is a transparent insulating layer, and light emitted by the first light-emitting layer is shielded by the patterned metal electrode layer and passes through the pattern defining layer to form the first pattern beam;
a fourth electrode; and
a second light-emitting layer, disposed between the third electrode and the fourth electrode, wherein a part of the second light-emitting layer on the pattern defining layer does not emit light, and a part of the second light-emitting layer on the patterned metal electrode layer emits the second pattern beam.

9. The switchable floating image display device according to claim 1, wherein the light-emitting stack layer comprises:
a first electrode;
a second electrode; and
a light-emitting layer, disposed between the first electrode and the second electrode,
the light-emitting pattern stack layer comprises:
a transparent insulating layer; and
a plurality of micro-light-emitting diodes, embedded in the transparent insulating layer, arranged into a pattern, and configured to emit the second pattern beam, wherein light emitted by the light-emitting layer is shielded by the micro-light-emitting diodes, and passes through a region in the transparent insulating layer without the micro-light-emitting diodes to form the first pattern beam.

10. The switchable floating image display device according to claim 1, further comprising:
a first substrate, wherein the light-emitting stack layer is disposed on the first substrate;
a second substrate, disposed between the transparent barrier layer and the light-emitting pattern stack layer; and
a bonding layer, bonded to the transparent barrier layer and the second substrate.

11. The switchable floating image display device according to claim 1, wherein the light-emitting pattern stack layer is disposed between the light-emitting stack layer and the optical imaging module.

12. The switchable floating image display device according to claim 1, wherein the light-emitting stack layer is disposed between the light-emitting pattern stack layer and the optical imaging module.

13. The switchable floating image display device according to claim 1, wherein the optical imaging module comprises a lens array, a grating, a photonic crystal, or an optical fiber.

14. The switchable floating image display device according to claim 1, wherein the first floating image and the second floating image have different shapes, distribution ranges, colors, brightness, or combinations thereof.

15. The switchable floating image display device according to claim 1, wherein one of the first floating image and the second floating image is a planar image, and other one of the first floating image and the second floating image is a three-dimensional image.

16. The switchable floating image display device according to claim 1, wherein the light-emitting stack layer comprises:
a backlight source; and
a patterned light-shielding layer, disposed between the backlight source and the light-emitting pattern stack layer, wherein the patterned light-shielding layer allows a part of light emitted by the backlight source to pass through, and shields another part of the light emitted by the backlight source to form the first pattern beam.

* * * * *